Jan. 5, 1932.     B. HEFTYE     1,839,311
VALVE
Filed March 6, 1931
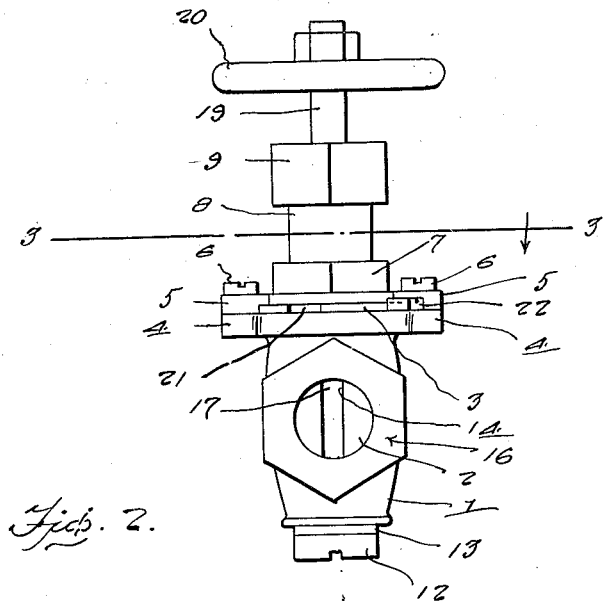
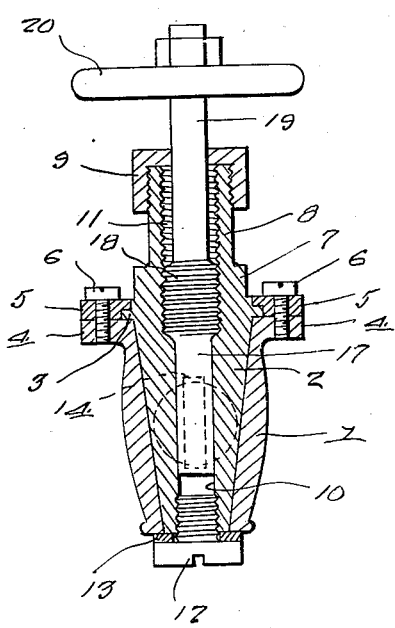
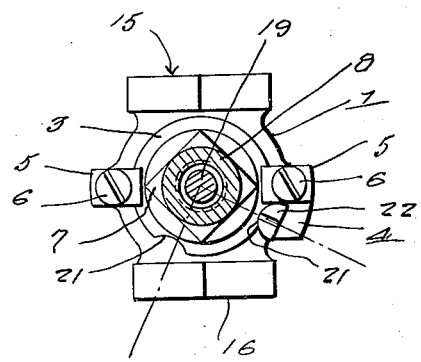
Inventor
Birger Heftye
By Clarence A. O'Brien
Attorney Patented Jan. 5, 1932

1,839,311

UNITED STATES PATENT OFFICE

BIRGER HEFTYE, OF TAMPICO, MEXICO

VALVE

Application filed March 6, 1931, Serial No. 520,677, and in Mexico February 6, 1931.

The present invention relates to a valve which forms the subject matter of an application filed by me in Mexico on February 6, 1931 and which bears Number 2691.

An important object of the invention is to provide, in a manner as hereinafter set forth, a valve embodying a novel construction and arrangement of parts whereby the same may be expeditiously regulated as desired to permit any desired volume of fluid to pass therethrough, the valve being regulated by setting the adjusting mechanism in predetermined positions.

Another important object of the invention is to provide a valve of the character described embodying a construction whereby the same may be cleaned whenever necessary or desirable without the necessity of utilizing other valves for shutting off the flow of fluid through the pipe during the cleaning operation.

Another important object of the invention is to provide a valve embodying means whereby the same may be rapidly moved to open or closed position for controlling the flow of fluid, the invention still further including novel means for securing the valve in open or closed position.

Other objects of the invention are to provide, in a manner as hereinafter set forth, a valve of the aforementioned character which will be simple in construction, strong, durable, efficient and reliable in operation and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:—

Figure 1 is a view in elevation of a valve constructed in accordance with the present invention.

Figure 2 is a view in vertical section through the valve.

Figure 3 is a view in horizontal section through the valve taken substantially on the line 3—3 of Figure 1 and looking downwardly.

Referring to the drawings in detail, it will be seen that the reference numeral 1 designates a valve casing having a tapered interior of circular cross section in which is rotatably mounted a tapered core 2 having a flange 3 thereon which rests on the upper end of the casing 1. Integral, apertured ears 4 extend from diametrically opposite sides of the upper end of the casing 1 and have mounted thereon the clips 5 which are engaged with the flange 3 in a manner to rotatably retain the core 2 in position in the casing 1. Screws 6 pass through the clips 5 and are anchored in the apertured ears 4 for securing the clips 5 in position, the apertures in the ears 4 being threaded, of course, for receiving the screws 6.

The core 2 further includes a polygonal portion 7 disposed above the flange 3 for receiving a suitable actuating tool such as a wrench, for rotating the core when it is so desired. The core 2 still further includes a neck 8 having its upper end portion externally threaded to receive a cap 9 which is provided with a centrally disposed opening for a purpose to be presently set forth.

Extending through the core from end to end thereof is a bore 10 having a threaded lower end portion and an enlarged threaded upper portion 11. A retaining screw 12 is threaded into the lower end portion of the bore 10 of the core 2 and said screw constitutes a closure plug for the lower end of the bore. A washer 13 is interposed between the head of the screw 12 and the lower ends of the core 2 and the casing 1.

The core 2 is provided with a diametrically extending, elongated, rectangular port 14 which is adapted to be brought into registry with the openings in the inlet and outlet nipples 15 and 16 of the casing 1 with which the pipes are connected in the usual manner. The port 14 intersects the bore 10 of the core 2.

A plug 17 is rotatably and slidably mounted in the smooth intermediate portion of the bore 10 which is intersected by the port 14. At its upper end the plug 17 merges with an enlarged threaded portion 18 which is threadedly engaged with the enlarged threaded portion 11 of the bore 10. A stem 19 extends rotatably through the centrally disposed opening in the cap 9 from the enlarged threaded portion 18 and has fixed on its upper end a hand wheel 20 providing means for operating the plug 17.

The flange 3 of the core 2 is provided with spaced peripheral segmental notches or recesses 21 for receiving the segmental, slotted head 22 of a keeper screw which is mounted on the upper end of the casing 1. The keeper screw is engageable in the notches or recesses 21 for locking the core 2 in either its open or closed position.

In use, the volume of fluid passing through the port 14 of the core 2 may be regulated as desired by threading the plug 17 longitudinally in the smooth portion of the bore 10 in a manner to gradually open or close the port 14. This, of course, is accomplished through the medium of the hand wheel 20. The movement of the plug 17 in the bore 10 with each revolution of the hand wheel 20 is, of course, regulated by the pitch of the threads of the portions 11 and 18. When it is desired to quickly open or shut the valve completely, the keeper screw 22 is moved to inoperative position and a wrench or other suitable tool applied to the polygonal portion 7 for rotating the core 2. As will be obvious, a one quarter turn of the core 2 moves the port 14 out of registry with the openings of the nipples 15 and 16 of the casing 1. The keeper screw 22 is then again moved to its operative position for locking the core 2 in the desired position.

When it is desired to remove sediment from the bore 10, the core 2 is rotated to its closed position after which the screw 12 and the plug 17 are removed entirely from the core 2. As will be apparent, the bore 10 of the core may then be conveniently cleaned, in any suitable manner.

It is believed that the many advantages of a valve constructed in accordance with this invention will be readily understood, and although the preferred embodiment of the invention is as illustrated and described, it is to be understood that changes in the details of construction may be had which will fall within the scope of the invention as claimed.

What is claimed is:—

1. A valve of the character described comprising a casing having a tapered interior and further having inlet and outlet ports, a tapered core mounted for rotation in the casing and having an elongated, rectangular port extending diametrically therethrough for registry with the casing ports, a flange on the core engageable with one end of the casing, clips mounted on the casing and engaged with the flange in a manner to rotatably retain the core in position in the casing, said core being further provided with a polygonal portion disposed outwardly of the casing, a neck extending longitudinally from the polygonal portion, the core being further provided with a bore extending therethrough and through the polygonal portion and the neck, said bore having a smooth intermediate portion, and threaded end portions, one of the threaded end portions of the bore being enlarged, said bore intersecting the port in the core, a removable plug threaded into one end portion of the bore, a plug mounted for longitudinal adjustment in the smooth portion of the bore in a manner to control the port of the core, and means for manually adjusting the plug in the bore.

2. A valve of the character described comprising a casing having a tapered interior and further having inlet and outlet ports, a tapered core mounted for rotation in the casing and having an elongated, rectangular port extending diametrically therethrough for registry with the casing ports, a flange on the core engageable with one end of the casing, clips mounted on the casing and engaged with the flange in a manner to rotatably retain the core in position in the casing, said core being further provided with a polygonal portion disposed outwardly of the casing, a neck extending longitudinally from the polygonal portion, the core being further provided with a bore extending therethrough and through the polygonal portion and the neck, said bore having a smooth intermediate portion, and threaded end portions, one of the threaded end portions of the bore being enlarged, said bore intersecting the port in the core, a removable plug mounted for longitudinal adjustment in the smooth portion of the bore in a manner to control the port of the core, and means for manually adjusting the plug in the bore, said means comprising an enlarged threaded portion formed integrally with the plug and threadedly engaged in the enlarged end portion of the bore, a stem formed integrally with the enlarged threaded portion and projecting therefrom outwardly from the neck, a hand wheel fixed on the stem, a cap threaded on the neck and encircling the stem.

3. A valve of the character described comprising a casing having a tapered interior and further having inlet and outlet ports, a tapered core mounted for rotation in the casing and having an elongated, rectangular port extending diametrically therethrough for registry with the casing ports, a flange on the core engageable with one end of the casing, clips mounted on the casing and engaged with the flange in a manner to rotatably retain the core in position in the casing, said core being further provided with a polygonal portion disposed outwardly of the casing, a neck extending longitudinally from the polygonal portion, the core being further provided with a bore extending therethrough and through the polygonal portion and the neck, said bore having a smooth intermediate portion, and threaded end portions, one of the threaded end portions of the bore being enlarged, said bore intersecting the port in the core, a removable plug mounted for longitudinal adjustment in the smooth portion of the bore in a manner to control the port of the core, and means for manually adjusting the plug in the bore, said means comprising an enlarged threaded portion formed integrally with the plug and threadedly engaged in the enlarged end portion of the bore, a stem formed integrally with the enlarged threaded portion and projecting therefrom outwardly from the neck, a hand wheel fixed on the stem, a cap threaded on the neck and encircling the stem, the flange being provided with spaced, segmental notches in its periphery, and a keeper screw mounted on the casing and having a segmental head engageable in the notches for securing the core against rotation in the casing.

In testimony whereof I affix my signature.

BIRGER HEFTYE.